US010694536B2

(12) United States Patent
Jiang et al.

(10) Patent No.: US 10,694,536 B2
(45) Date of Patent: Jun. 23, 2020

(54) DYNAMIC DOWNLINK CONTROL INFORMATION TIMING INDICATIONS IN NEW RADIO

(71) Applicant: QUALCOMM Incorporated, San Diego, CA (US)

(72) Inventors: Jing Jiang, San Diego, CA (US); Yang Yang, San Diego, CA (US); Renqiu Wang, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 16/206,633

(22) Filed: Nov. 30, 2018

(65) Prior Publication Data

US 2019/0174518 A1    Jun. 6, 2019

Related U.S. Application Data

(60) Provisional application No. 62/594,382, filed on Dec. 4, 2017.

(51) Int. Cl.
*H04W 4/00* (2018.01)
*H04W 72/12* (2009.01)
(Continued)

(52) U.S. Cl.
CPC ....... *H04W 72/1268* (2013.01); *H04L 5/0055* (2013.01); *H04L 5/0082* (2013.01);
(Continued)

(58) Field of Classification Search
CPC ........ H04W 72/1268; H04W 72/1289; H04W 72/14; H04W 72/042; H04W 76/27; H04L 5/0055; H04L 5/0082; H04L 5/0094
(Continued)

(56) References Cited

U.S. PATENT DOCUMENTS

2014/0029586 A1*  1/2014  Loehr .............. H04W 56/0005
                                                370/336
2014/0192759 A1*  7/2014  Son ................... H04W 72/0426
                                                370/329
(Continued)

FOREIGN PATENT DOCUMENTS

EP      2495887 A2    9/2012
EP      2809023 A1    12/2014

OTHER PUBLICATIONS

CATT: "Discussion on DL/UL Scheduling and HARQ Management," 3GPP Draft; R1-1716658, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017, XP051340108, 6 pages, Retrieved from the Internet: URL: http://www.3gpp.org/ftp/Meetings_3GPP_SYNC/RAN1/Docs/ [retrieved on Sep. 9, 2017].
(Continued)

*Primary Examiner* — Thai D Hoang
(74) *Attorney, Agent, or Firm* — Harrity & Harrity LLP/Qualcomm Incorporated

(57) ABSTRACT

In some aspects, a user equipment (UE) may receive downlink control information (DCI) that includes a timing value indicating a timing of an opportunity, subsequent to reception of the DCI, for transmission or reception of a communication corresponding to the DCI. The UE may determine an uplink opportunity or a downlink opportunity for transmission or reception of the communication based at least in part on the timing of the opportunity. A counter for determining the uplink opportunity may be incremented only for transmission time intervals (TTIs) in which the UE is allowed to transmit the communication in an uplink channel. A counter for determining the downlink opportunity may be incremented only for TTIs in which the UE can expect to receive the communication in a downlink channel. The UE
(Continued)

may transmit or receive the communication in the uplink opportunity or the downlink opportunity. Other aspects are disclosed.

30 Claims, 14 Drawing Sheets

(51) Int. Cl.
  *H04L 5/00* (2006.01)
  *H04W 72/04* (2009.01)
  *H04W 76/27* (2018.01)
  *H04W 72/14* (2009.01)
  *H04B 7/0413* (2017.01)
  *H04L 5/14* (2006.01)

(52) U.S. Cl.
  CPC ......... *H04L 5/0094* (2013.01); *H04W 72/042* (2013.01); *H04W 72/1289* (2013.01); *H04W 72/14* (2013.01); *H04W 76/27* (2018.02); *H04B 7/0413* (2013.01); *H04L 5/1469* (2013.01); *H04W 72/0446* (2013.01)

(58) Field of Classification Search
  USPC ................ 370/329–330, 335–345, 347–348
  See application file for complete search history.

(56) References Cited

U.S. PATENT DOCUMENTS

2014/0293893 A1* 10/2014 Papasakellariou .... H04W 72/04
  370/329
2015/0110017 A1* 4/2015 Park ...................... H04L 1/1861
  370/329
2019/0149380 A1* 5/2019 Babaei ................... H04L 5/001
  370/330

OTHER PUBLICATIONS

International Search Report and Written Opinion—PCT/US2018/063600—ISA/EPO—dated Mar. 14, 2019.

* cited by examiner

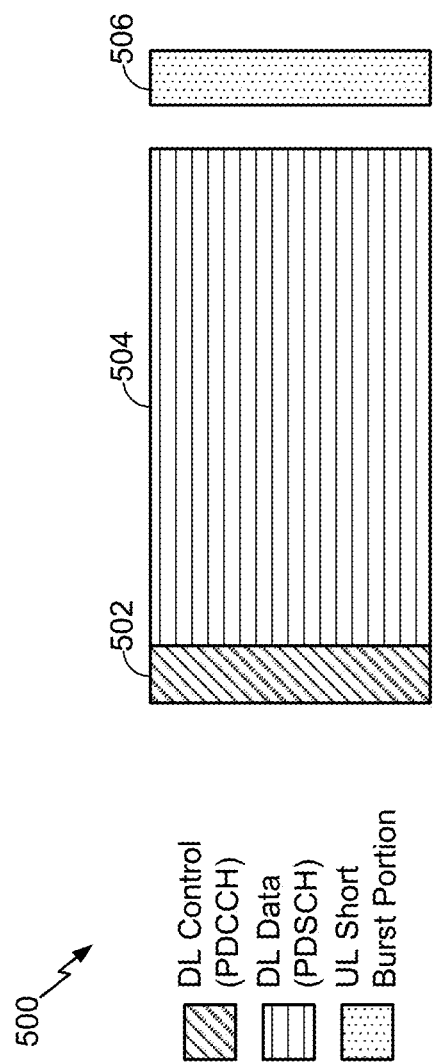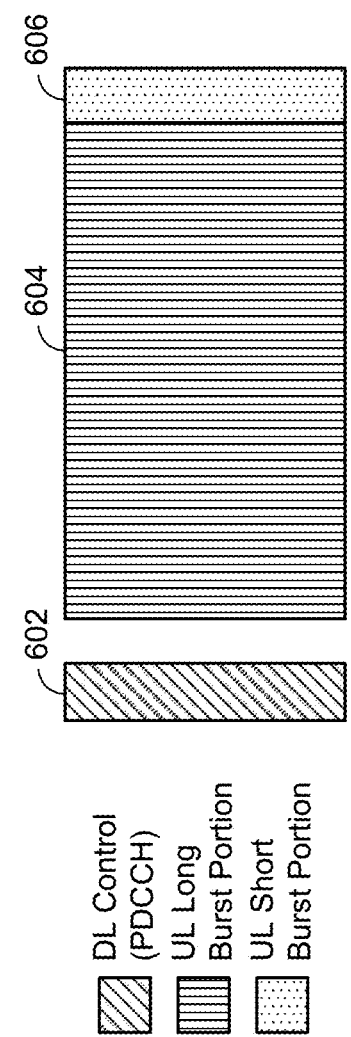

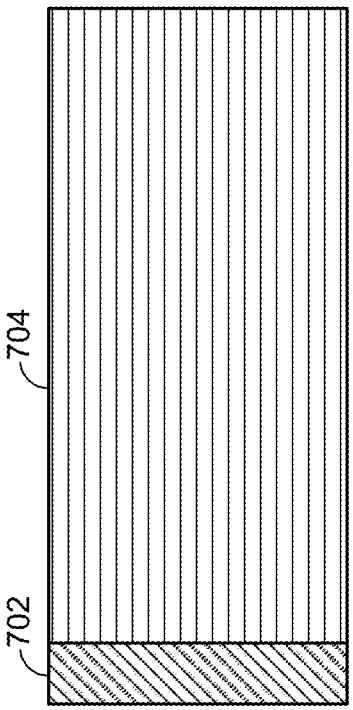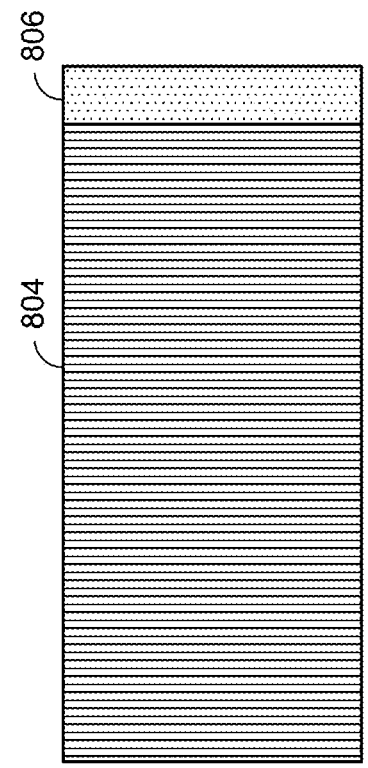
FIG. 7
FIG. 8

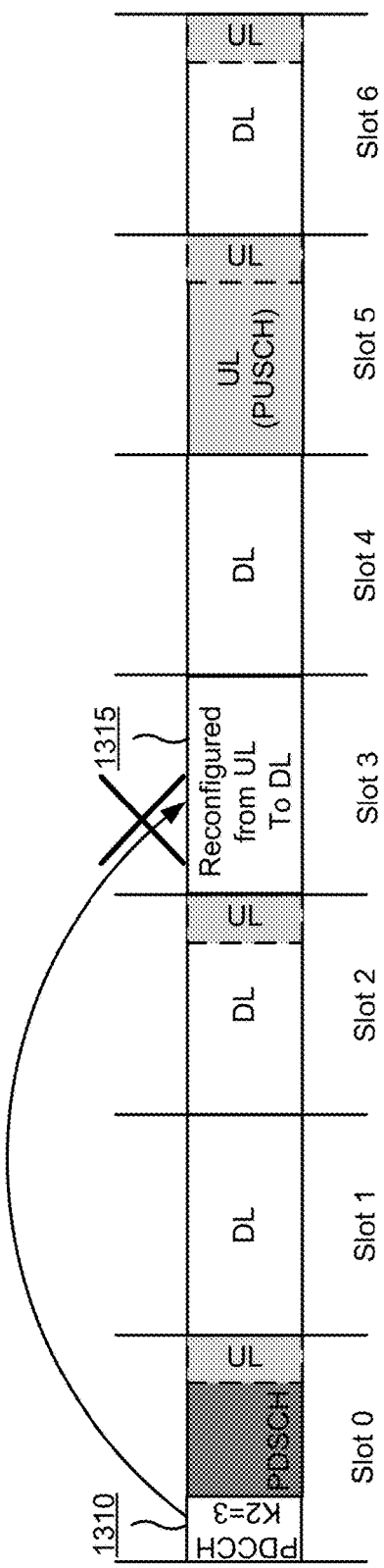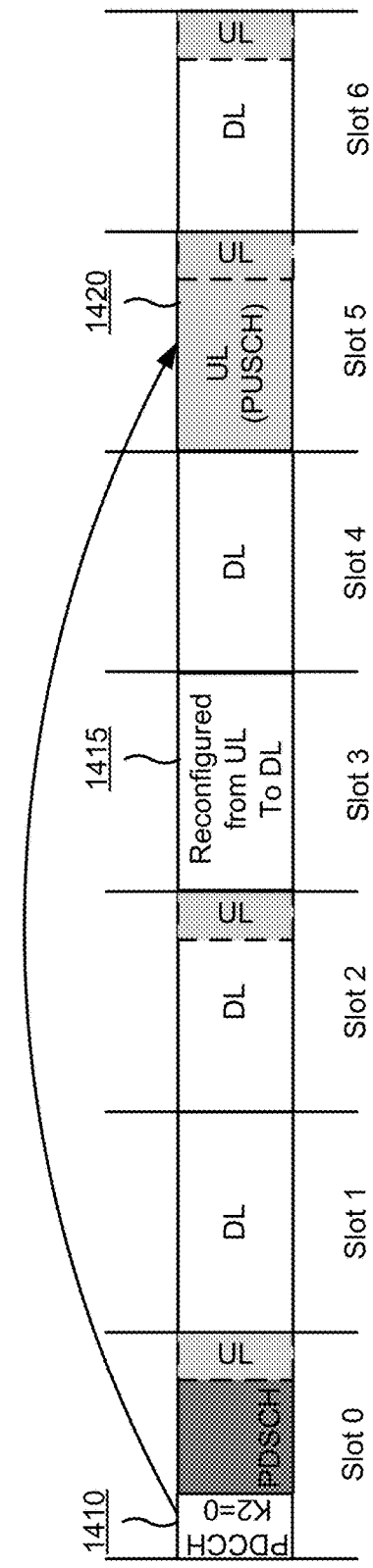

DYNAMIC DOWNLINK CONTROL INFORMATION TIMING INDICATIONS IN NEW RADIO

CROSS-REFERENCE TO RELATED APPLICATIONS UNDER 35 U.S.C. § 119

This application claims priority to U.S. Provisional Patent Application No. 62/594,382, filed on Dec. 4, 2017, entitled "TECHNIQUES AND APPARATUSES FOR DYNAMIC DOWNLINK CONTROL INFORMATION TIMING INDICATIONS IN NEW RADIO," which is hereby expressly incorporated by reference herein.

FIELD OF THE DISCLOSURE

Aspects of the present disclosure generally relate to wireless communication, and more particularly to techniques and apparatuses for dynamic downlink control information (DCI) timing indications in New Radio.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication may be performed by a user equipment (UE). The method may include receiving downlink control information (DCI) that includes a timing value indicating a timing of an opportunity, subsequent to reception of the DCI, for transmission or reception of a communication corresponding to the DCI; determining an uplink opportunity for transmission of the communication or a downlink opportunity for reception of the communication based at least in part on the timing of the opportunity, wherein a counter for determining the uplink opportunity is incremented only for transmission time intervals (TTIs) in which the UE is allowed to transmit the communication in an uplink channel, or wherein a counter for determining the downlink opportunity is incremented only for TTIs in which the UE can expect to receive the communication in a downlink channel; and transmitting or receiving the communication in the uplink opportunity or the downlink opportunity.

In some aspects, a UE for wireless communication may include memory and one or more processors operatively coupled to the memory. The memory and the one or more processors may be configured to receive downlink control information (DCI) that includes a timing value indicating a timing of an opportunity, subsequent to reception of the DCI, for transmission or reception of a communication corresponding to the DCI; determine an uplink opportunity for transmission of the communication or a downlink opportunity for reception of the communication based at least in part on the timing of the opportunity, wherein a counter for determining the uplink opportunity is incremented only for transmission time intervals (TTIs) in which the UE is allowed to transmit the communication in an uplink channel, or wherein a counter for determining the downlink opportunity is incremented only for TTIs in which the UE can expect to receive the communication in a downlink channel; and transmit or receive the communication in the uplink opportunity or the downlink opportunity.

In some aspects, a non-transitory computer-readable medium may store one or more instructions for wireless communication. The one or more instructions, when executed by one or more processors of a UE, may cause the one or more processors to receive downlink control information (DCI) that includes a timing value indicating a timing of an opportunity, subsequent to reception of the DCI, for transmission or reception of a communication corresponding to the DCI; determine an uplink opportunity for transmission of the communication or a downlink opportunity for reception of the communication based at least in part on the timing of the opportunity, wherein a counter for determining the uplink opportunity is incremented only for transmission time intervals (TTIs) in which the UE is allowed to transmit the communication in an uplink channel, or wherein a counter for determining the downlink opportunity is incremented only for TTIs in which the UE can expect to receive the communication in a downlink channel;

and transmit or receive the communication in the uplink opportunity or the downlink opportunity.

In some aspects, an apparatus for wireless communication may include means for receiving downlink control information (DCI) that includes a timing value indicating a timing of an opportunity, subsequent to reception of the DCI, for transmission or reception of a communication corresponding to the DCI; means for determining an uplink opportunity for transmission of the communication or a downlink opportunity for reception of the communication based at least in part on the timing of the opportunity, wherein a counter for determining the uplink opportunity is incremented only for transmission time intervals (TTIs) in which the UE is allowed to transmit the communication in an uplink channel, or wherein a counter for determining the downlink opportunity is incremented only for TTIs in which the UE can expect to receive the communication in a downlink channel; and means for transmitting or receiving the communication in the uplink opportunity or the downlink opportunity.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example of a downlink (DL)-centric slot, in accordance with various aspects of the present disclosure.

FIG. 6 is a diagram illustrating an example of an uplink (UL)-centric slot, in accordance with various aspects of the present disclosure.

FIG. 7 is a diagram illustrating an example of a full-DL or DL-only slot, in accordance with various aspects of the present disclosure.

FIG. 8 is a diagram illustrating an example of a full-UL or UL-only slot, in accordance with various aspects of the present disclosure.

FIGS. 11-16 are diagrams illustrating examples of dynamic downlink control information (DCI) timing indications, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
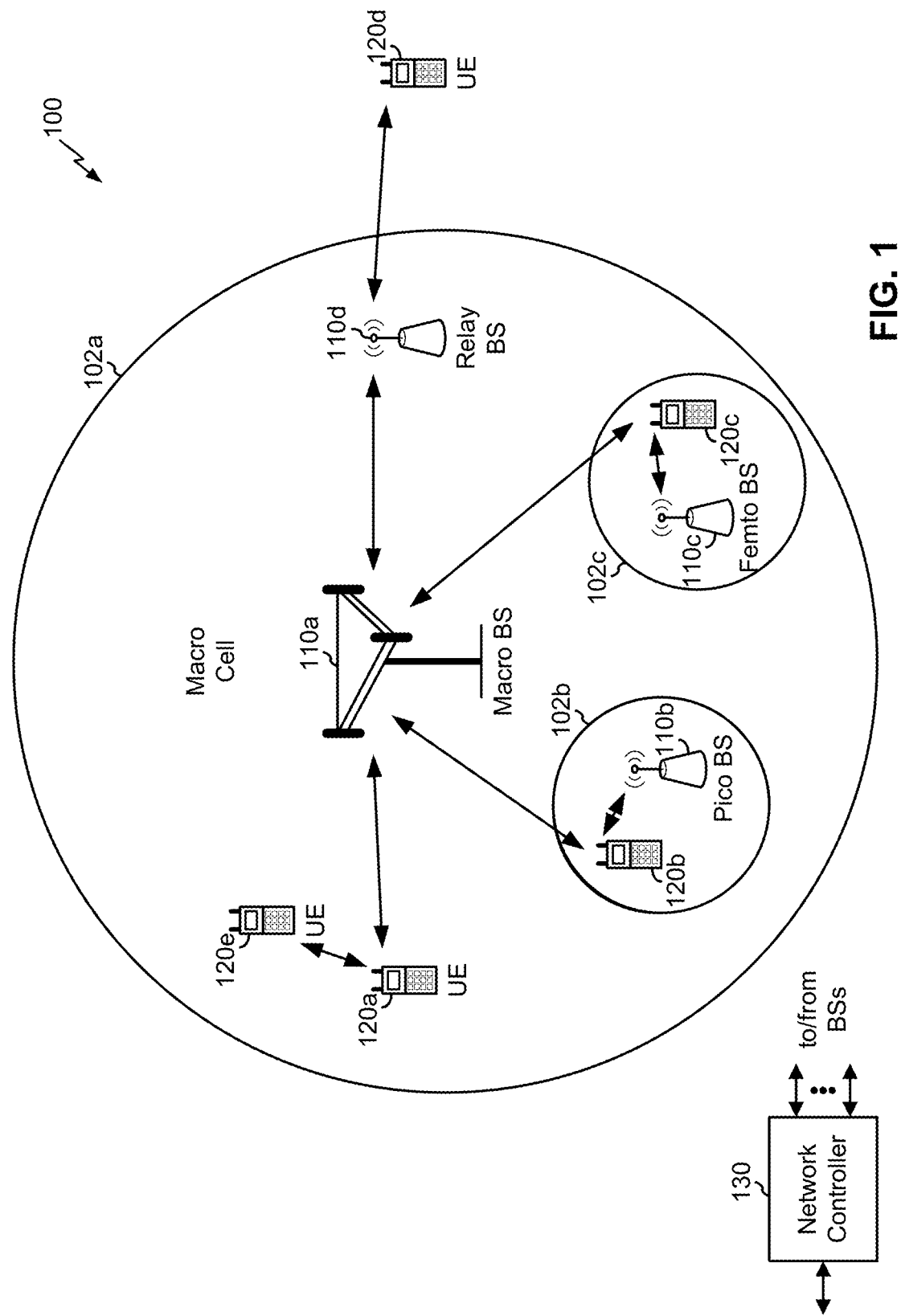
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
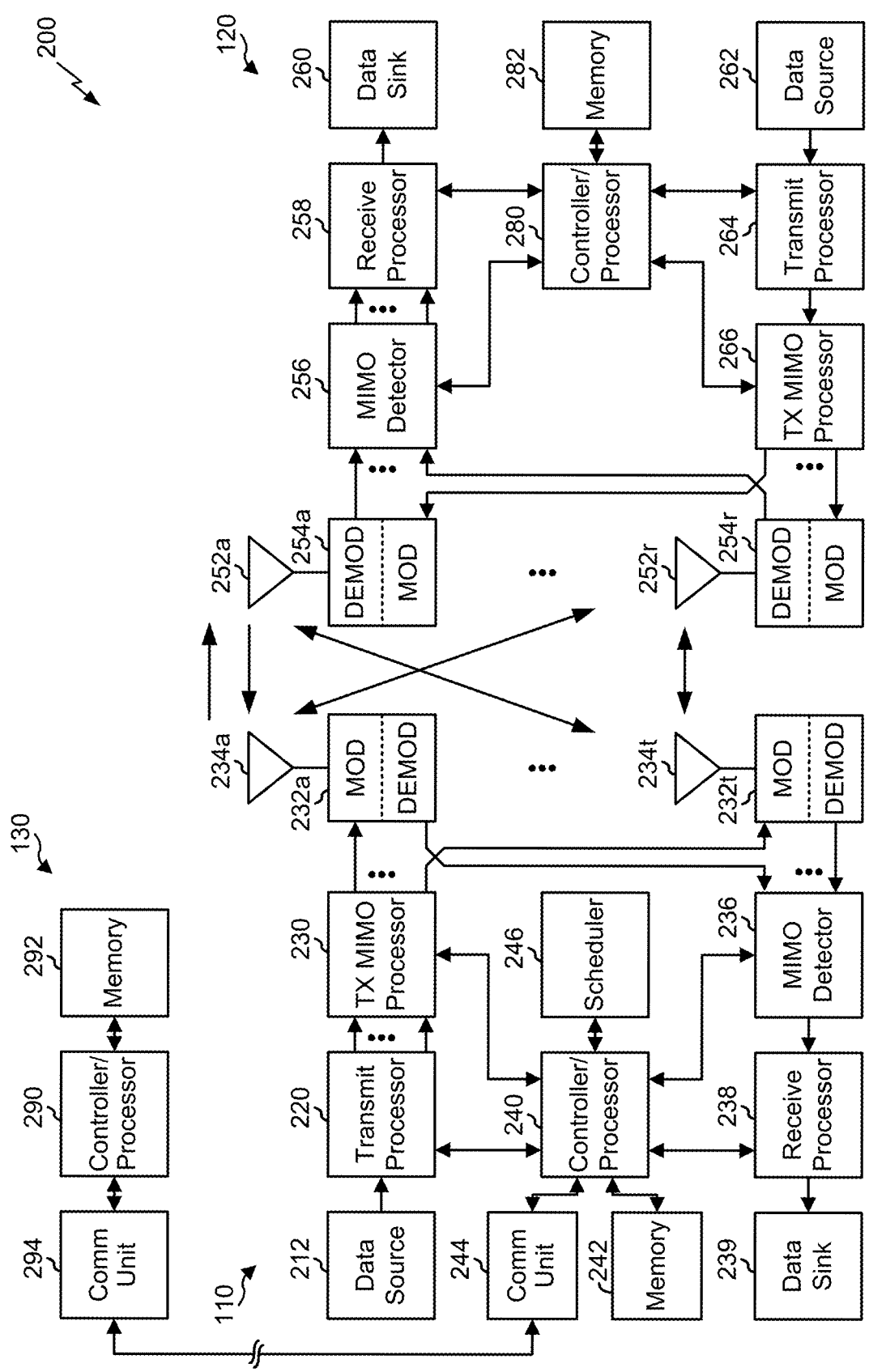
FIG. 2 is a block diagram conceptually illustrating an example of a base station in communication with a user equipment (UE) in a wireless communication network, in accordance with various aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280.

Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with dynamic DCI timing indications, as described in more detail elsewhere herein. For example, controller/processor 240 of base station 110, controller/processor 280 of UE 120, and/or any other component(s) of FIG. 2 may perform or direct operations of, for example, process 1700 of FIG. 17 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for receiving downlink control information (DCI) that includes a timing value indicating a timing of an opportunity, subsequent to reception of the DCI, for transmission or reception of a communication corresponding to the DCI; means for determining an uplink opportunity for transmission of the communication or a downlink opportunity for reception of the communication based at least in part on the timing of the opportunity; means for transmitting or receiving the communication in the uplink opportunity or the downlink opportunity; and/or the like. In some aspects, such means may include one or more components of UE 120 described in connection with FIG. 2.

As indicated above, FIG. 2 is provided as an example. Other examples are may differ from what is described with regard to FIG. 2.

Figure 3A:
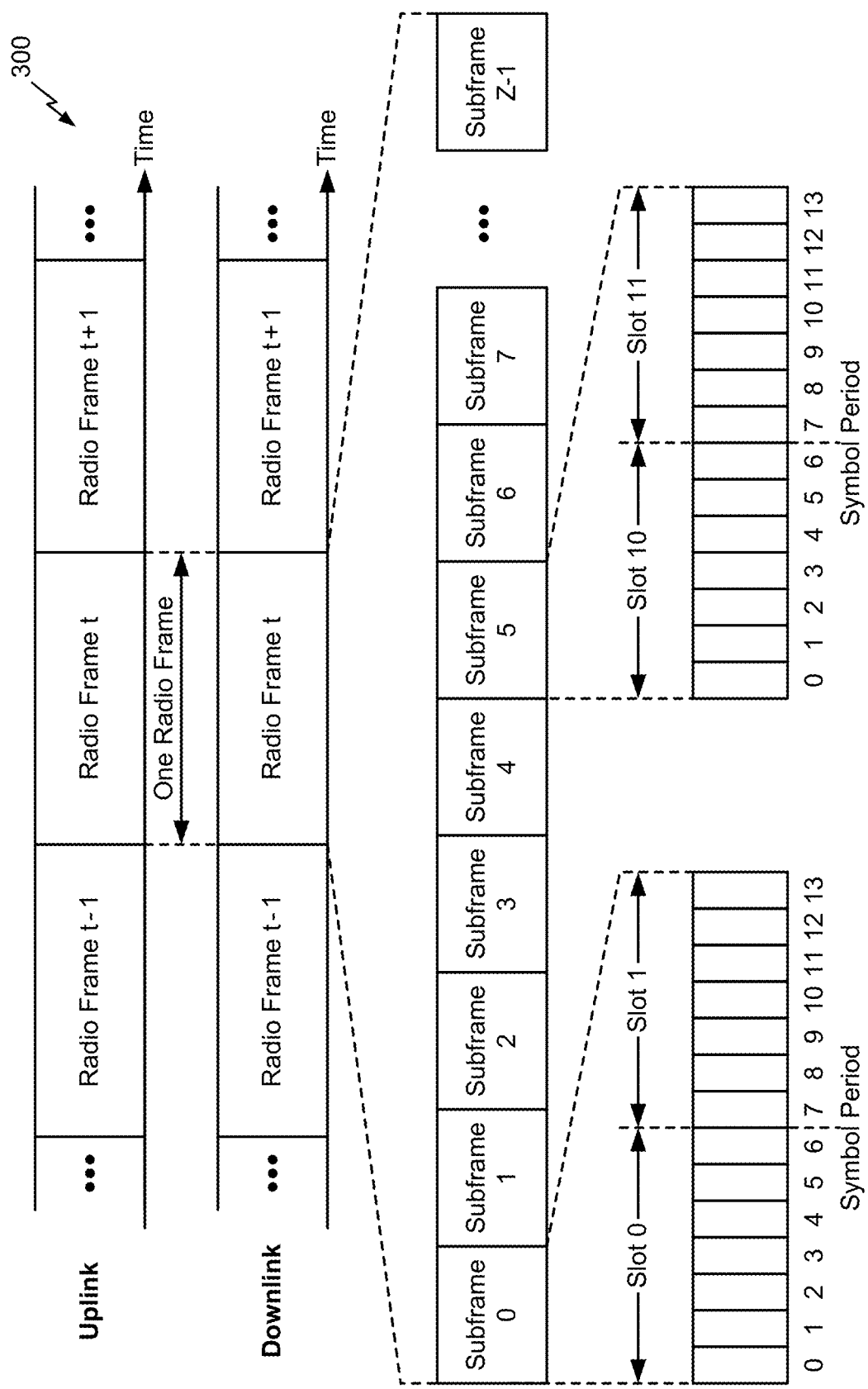
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a slot may include one or more mini-slots. A mini-slot may include a number of symbols (e.g., 2 symbols, 3 symbols, 4 symbols, and/or the like) capable of being scheduled as a unit. In some aspects, a scheduling unit for the FDD may frame-based, subframe-based, slot-based, mini-slot-based, symbol-based, and/or the like.

While some techniques are described herein in connection with frames, subframes, slots, mini-slots, and/or the like, these techniques may equally apply to other types of wireless communication structures or transmission time intervals (TTIs), which may be referred to using terms other than "frame," "subframe," "slot," "mini-slot," and/or the like in 5G NR. In some aspects, a wireless communication structure or a TTI may refer to a periodic time-bounded communication unit defined by a wireless communication standard and/or protocol. Additionally, or alternatively, different configurations of wireless communication structures and/or TTIs than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
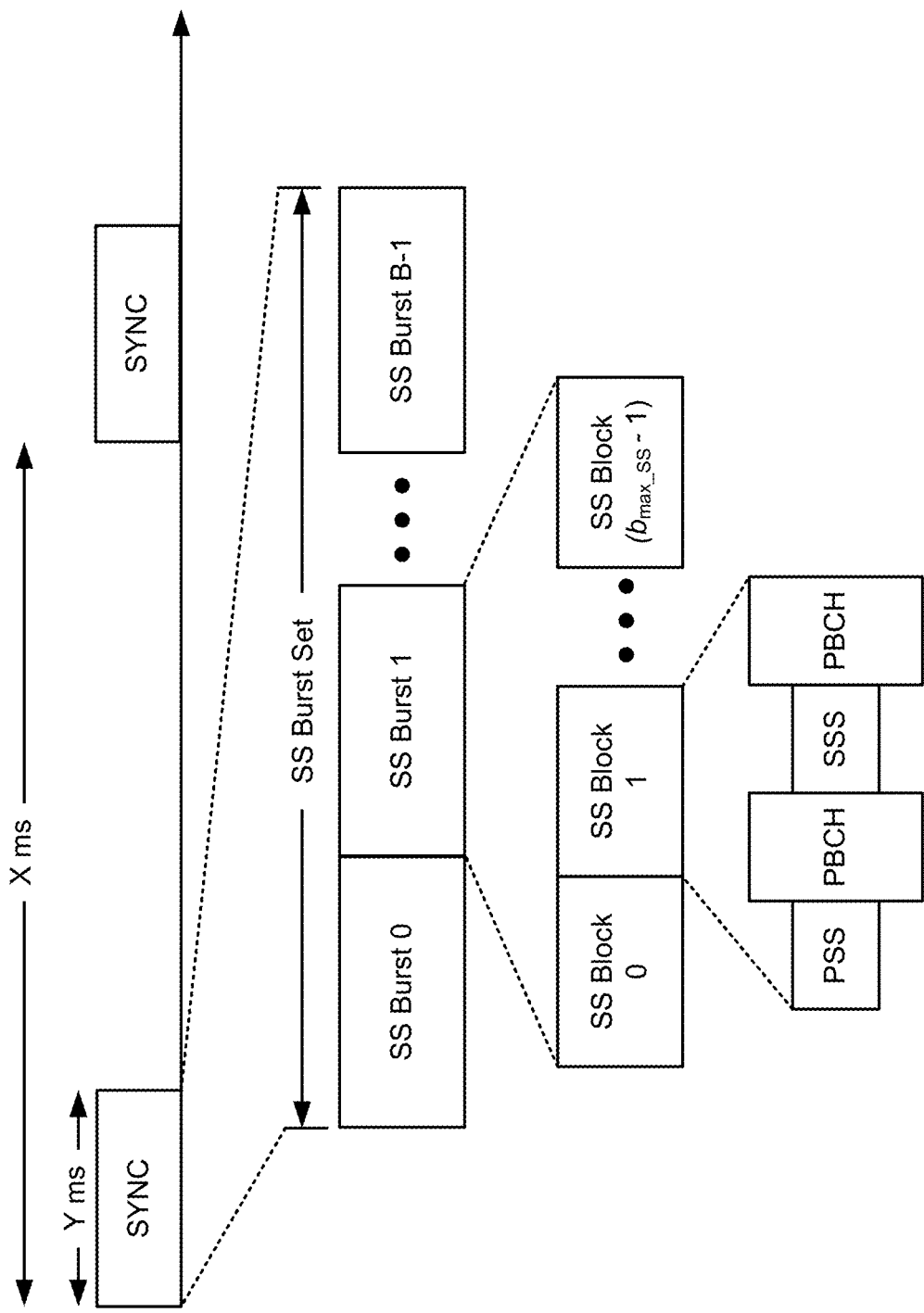
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples may differ from what is described with regard to FIGS. 3A and 3B.

Figure 4:
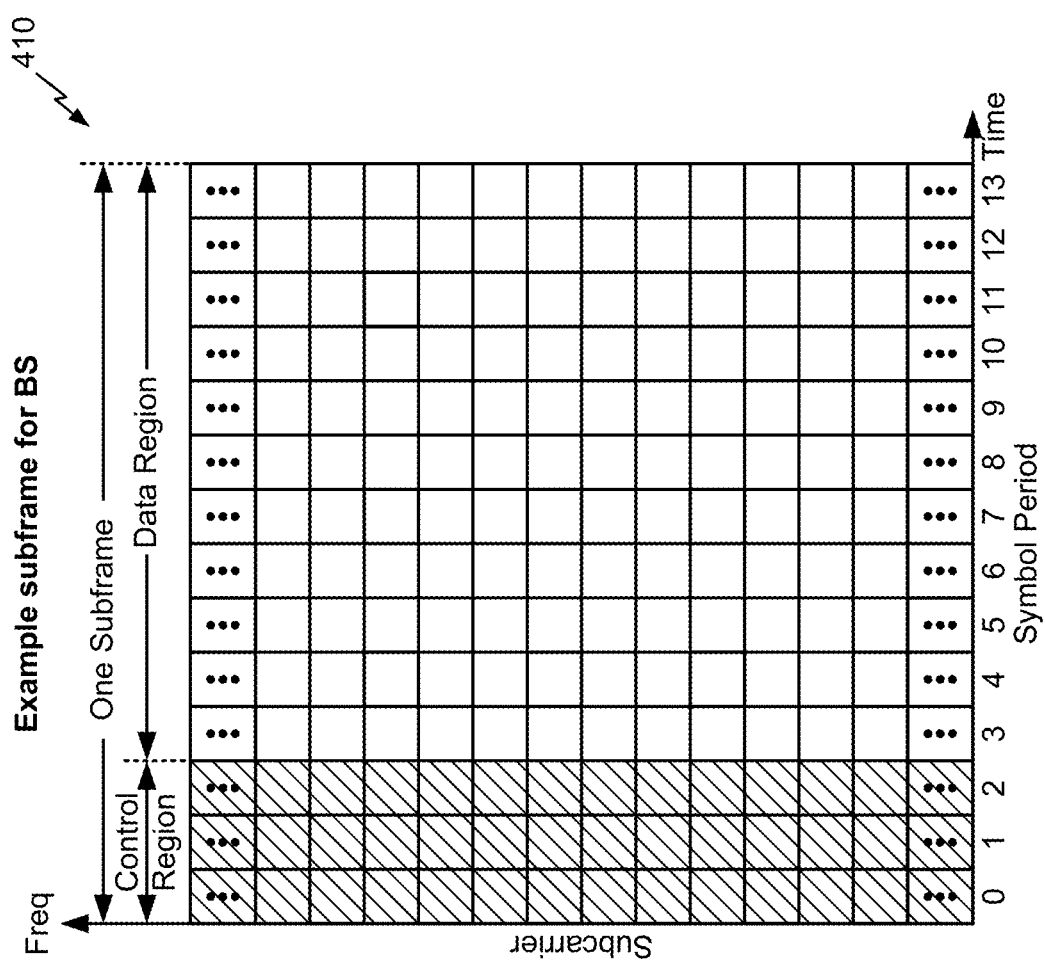
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

FIG. 5 is a diagram 500 showing an example of a DL-centric slot or wireless communication structure. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. In some aspects, the control portion 502 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include an UL short burst portion 506. The UL short burst portion 506 may sometimes be referred to as an UL burst, an UL burst portion, a common UL burst, a short burst, an UL short burst, a common UL short burst, a common UL short burst portion, and/or various other suitable terms. In some aspects, the UL short burst portion 506 may include one or more reference signals. Additionally, or alternatively, the UL short burst portion 506 may include feedback information corresponding to various other portions of the DL-centric slot. For example, the UL short burst portion 506 may include feedback information corresponding to the control portion 502 and/or the data portion 504. Non-limiting examples of information that may be included in the UL short burst portion 506 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 506 may include additional or alternative information, such as information pertaining to random access channel (RACH) procedures, scheduling requests, and various other suitable types of information.

As illustrated in FIG. 5, the end of the DL data portion 504 may be separated in time from the beginning of the UL short burst portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 5 is provided as an example. Other examples may differ from what is described with regard to FIG. 5.

FIG. 6 is a diagram 600 showing an example of an UL-centric slot or wireless communication structure. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL long burst portion 604. The UL long burst portion 604 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL long burst portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 606. The UL short burst portion 606 in FIG. 6 may be similar to the UL short burst portion 506 described above with reference to FIG. 5, and may include any of the information described above in connection with FIG. 5. The foregoing is merely one example of an UL-centric wireless communication structure, and alternative structures having similar features may exist without necessarily deviating from the aspects described herein.

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 6 is provided as an example. Other examples may differ from what is described with regard to FIG. 6.

FIG. 7 is a diagram 700 illustrating an example of a full-DL or DL-only slot or wireless communication structure. The full-DL slot may include the first portion and the second portion described above in connection with FIG. 5 (e.g., the DL control portion 502 and the DL data portion 504), shown as a DL control portion 702 and a DL data portion 704. The full-DL slot may exclude the third portion described above in connection with FIG. 5 (e.g., the UL short burst portion 506).

The DL control portion 702 may be located at the beginning of the full-DL slot. The DL control portion 702 may be used in a similar manner as the DL control portion 502 and/or the DL control portion 602, described above in connection with FIGS. 5 and 6.

The DL data portion 704 may be located after the DL control portion 702 and at an end of the full-DL slot. The DL data portion 704 may be used in a similar manner as the DL data portion 504, described above in connection with FIG. 5.

As indicated above, FIG. 7 is provided as an example. Other examples may differ from what is described with regard to FIG. 7.

FIG. 8 is a diagram 800 illustrating an example of a full-UL or UL-only slot or wireless communication structure. The full-UL slot may include the second portion and the third portion described above in connection with FIG. 6 (e.g., the UL long burst portion 604 and the UL short burst portion 606), shown as an UL long burst portion 804 and an UL short burst portion 806. The full-UL slot may exclude the first portion described above in connection with FIG. 6 (e.g., the DL control portion 602).

The UL long burst portion 804 may be located at the beginning of the full-UL slot. The UL long burst portion 804 may be used in a similar manner as the UL long burst portion 604, described above in connection with FIG. 6.

The UL short burst portion 806 may be located after the UL long burst portion 804 and at an end of the full-UL slot. The UL short burst portion 806 may be used in a similar manner as the UL short burst portion 506 and/or the UL short burst portion 606, described above in connection with FIGS. 5 and 6.

As indicated above, FIG. 8 is provided as an example. Other examples may differ from what is described with regard to FIG. 8.

Figure 9:
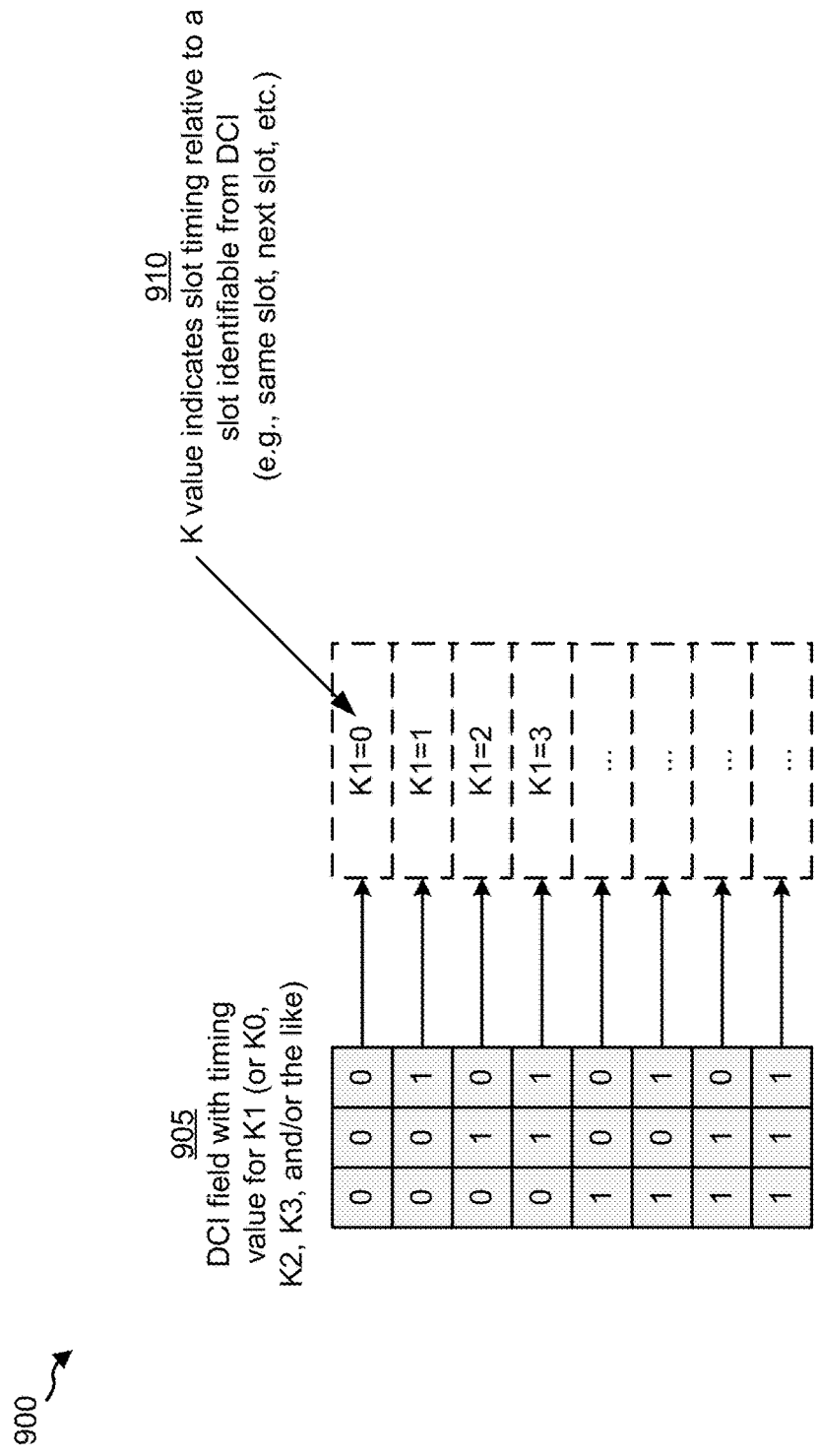
FIG. 9 is a diagram illustrating an example of a dynamic indication of a slot timing in DCI, in accordance with various aspects of the present disclosure.

FIG. 9 is a diagram illustrating an example 900 of a dynamic indication of a slot timing in DCI, in accordance with various aspects of the present disclosure.

In example 900, a timing value in DCI indicates a slot timing for a communication. The slot timing indicates a slot in which the communication is to be transmitted or received by a UE 120. In some aspects, the slot timing may indicate a slot for the communication relative to a slot in which the DCI is received by the UE 120 (e.g., in the case of K0 and K2 values, described below). Additionally, or alternatively, the slot timing may indicate a slot for the communication relative to a slot in which a downlink data communication, granted by the DCI, is received by the UE 120 (e.g., in the case of K1, described below). Additionally, or alternatively, the slot timing may indicate a slot for the communication relative to a slot in which an acknowledgement or negative acknowledgement (ACK/NACK) indication is transmitted by the UE 120, where the ACK/NACK indication corresponds to a downlink data communication granted by the DCI (e.g., in the case of K3, described below).

As shown by reference number 905, the DCI may include a DCI field that includes a timing value for a communication. The communication may include a downlink data communication, an ACK/NACK indication, an uplink data communication, a retransmission of a downlink data communication, and/or the like. For example, the timing value may indicate a timing between a downlink grant included in the DCI and reception of a corresponding downlink data communication (e.g., a K0 value), a timing between reception of a downlink data communication granted in the DCI and transmission of a corresponding ACK/NACK indication (e.g., a K1 value), a timing between reception of an uplink grant included in the DCI and transmission of a corresponding uplink data communication (e.g., a K2 value), a timing between transmission of a NACK indication corresponding to a downlink data communication granted in the DCI and reception of a retransmission of the downlink data communication (e.g., a K3 value), and/or the like.

As shown by reference number 910, in some aspects, the timing value may indicate a slot timing that identifies a slot for the communication (e.g., relative to another slot that the UE 120 is capable of identifying based at least in part on the DCI that includes the timing value). For example, a timing value of K1=0 may indicate that the UE 120 is to transmit an ACK/NACK indication in the same slot as a corresponding downlink data communication, a timing value of K1=1 may indicate that the UE 120 is to transmit an ACK/NACK indication in the next slot after a corresponding downlink data communication, a timing value of K1=2 may indicate that the UE 120 is to transmit an ACK/NACK indication two slots after a corresponding downlink data communication, and/or the like. In this way, timing may be dynamically indicated, which increases a flexibility of scheduling in New Radio.

However, in New Radio, slots may be dynamically configured and/or reconfigured, such as by using a slot format described above in connection with FIGS. 5-8 (e.g., a DL-centric slot, an UL-centric slot, a DL-only slot, an UL-only slot, and/or the like). For example, a base station 110 may flexibly and dynamically configure slots over time (e.g., for a number of future slots), and/or may reconfigure one or more slots that have already been configured. In this case, the slot timing may identify a slot in which the UE 120 is incapable of transmitting and/or receiving a communication, resulting in an error. For example, a timing value of K1=3 may indicate that the UE 120 is to transmit an ACK/NACK indication three slots after a corresponding downlink data communication is received by the UE 120. However, if the slot that is three slots after the corresponding downlink data communication is configured or reconfigured as a DL-only slot, then the UE 120 will not have an opportunity to transmit the ACK/NACK indication in that slot. Similar issues may arise with other timing values (e.g., K0, K2, K3, and/or the like).

Techniques and apparatuses described herein use an opportunity timing (e.g., instead of a slot timing) to indicate a downlink opportunity for reception of a communication by a UE 120 or an uplink opportunity for transmission of a communication by the UE 120. By receiving an indication of an opportunity instead of a slot, the UE 120 may be capable of transmitting or receiving the communication regardless of configurations or reconfigurations of upcoming slots. In this way, communication errors may be reduced. Furthermore, by indicating a number of opportunities rather than a number of slots (or a number of TTIs), the timing may be indicated using less overhead (e.g., fewer bits) reserved for indicating the timing.

As indicated above, FIG. 9 is provided as an example. Other examples and may differ from what is described with regard to FIG. 9.

Figure 10:
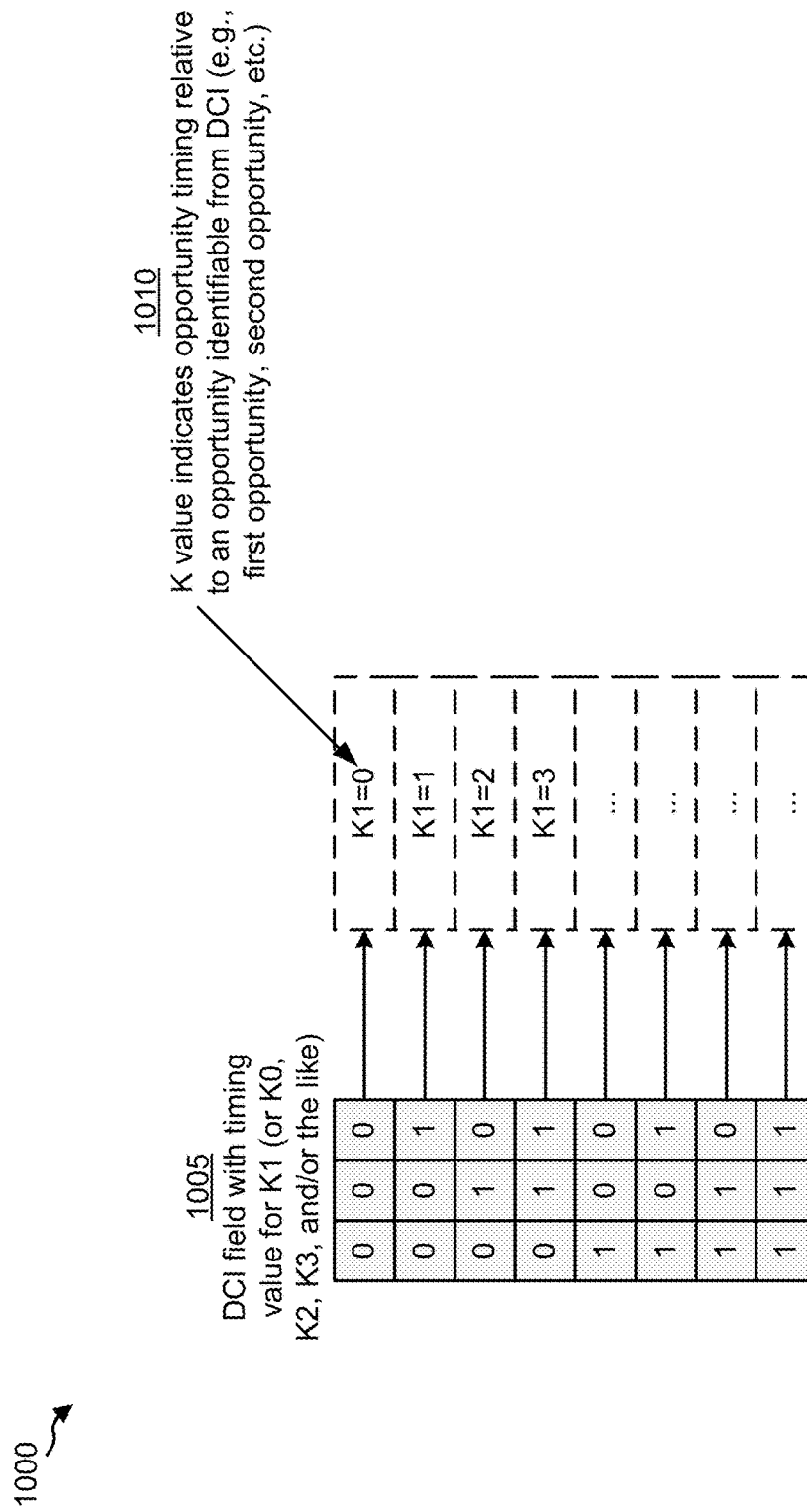
FIG. 10 is a diagram illustrating an example of a dynamic indication of an opportunity timing in DCI, in accordance with various aspects of the present disclosure.

FIG. 10 is a diagram illustrating another example 1000 of a dynamic indication of an opportunity timing in DCI, in accordance with various aspects of the present disclosure.

In example 1000, a timing value in DCI indicates an opportunity timing for a communication. The opportunity timing indicates an opportunity (e.g., an uplink opportunity or a downlink opportunity) in which the communication is to be scheduled, transmitted, or received by a UE 120. In some aspects, an opportunity may be a portion of a slot (e.g., a mini-slot, a set of symbols, and/or the like). For example, a downlink opportunity for reception of downlink data may be a downlink data portion 504, 704. As another example, an uplink opportunity for transmission of uplink data and/or uplink control information (UCI) may be an uplink long burst portion 604, 804 and/or an uplink short burst portion 606, 806. In some aspects, a granularity of the opportunity may depend on a granularity of a timing value (e.g., a K value). For example, the opportunity may be slot-based, mini-slot-based, symbol-based, and/or the like. Thus, the timing of the opportunity may represent a number of slots that include an opportunity, a number of mini-slots that include an opportunity, a number of symbols that include an opportunity, and/or the like.

In some aspects, the opportunity timing may indicate an opportunity for the communication relative to an opportunity (e.g., a portion of a slot) in which the DCI is received by the UE 120 (e.g., in the case of K0 and K2 values). Additionally, or alternatively, the opportunity timing may indicate an opportunity for the communication relative to an opportunity (e.g., a portion of a slot) in which a downlink data communication, granted by the DCI, is received by the UE 120 (e.g., in the case of K1). Additionally, or alternatively, the opportunity timing may indicate an opportunity for the communication relative to an opportunity (e.g., a portion of a slot) in which an ACK/NACK indication is transmitted by the UE 120, where the ACK/NACK indication corresponds to a downlink data communication granted by the DCI (e.g., in the case of K3).

As shown by reference number 1005, the DCI may include a DCI field that includes a timing value for a communication. As described above in connection with FIG. 9, the communication may include a downlink data communication, an ACK/NACK indication, an uplink data communication, a retransmission of a downlink data communication, and/or the like. For example, the timing value may indicate a timing between a downlink grant included in the DCI and reception of a corresponding downlink data communication (e.g., a K0 value), a timing between reception of a downlink data communication granted in the DCI and transmission of a corresponding ACK/NACK indication (e.g., a K1 value), a timing between reception of an uplink grant included in the DCI and transmission of a corresponding uplink data communication (e.g., a K2 value), a timing between transmission of a NACK indication corresponding to a downlink data communication granted in the DCI and reception of a retransmission of the downlink data communication (e.g., a K3 value), and/or the like.

As shown by reference number 1010, in some aspects, the timing value may indicate an opportunity timing that identifies an opportunity for the communication (e.g., relative to another opportunity that the UE 120 is capable of identifying based at least in part on the DCI that includes the timing value). For example, a timing value of K1=0 may indicate that the UE 120 is to transmit an ACK/NACK indication in the first opportunity (e.g., the first uplink opportunity) after a corresponding downlink data communication is received by the UE 120, a timing value of K1=1 may indicate that the UE 120 is to transmit an ACK/NACK indication in the second opportunity (e.g., the second uplink opportunity) after a corresponding downlink data communication is received by the UE 120, a timing value of K1=2 may indicate that the UE 120 is to transmit an ACK/NACK indication in the third opportunity (e.g., the third uplink opportunity) after a corresponding downlink data communication is received by the UE 120, and/or the like.

In some aspects, the UE 120 may use a counter to determine an opportunity in which the communication is to be transmitted or received. When using a TTI timing (e.g., slot timing), as described above in connection with FIG. 9, the UE 120 may increment the counter for each subsequent TTI (e.g., each subsequent slot) to determine the TTI for scheduling, transmitting, or receiving the communication. However, when using an opportunity timing, the UE 120 may increment the counter only for the TTIs (e.g., slots, mini-slot, symbols, and/or the like) in which the communication is allowed to be scheduled. In some aspects, a TTI in which a communication is allowed (e.g., to be scheduled, to be transmitted, or can be expected to be received) is defined as an opportunity for UE 120 scheduling, transmission, or reception of the communication and/or a TTI during which the UE 120 is capable of being scheduled, transmitting, or receiving the communication.

For example, when the communication is an uplink communication, the UE 120 may increment a counter for determining an uplink opportunity only for TTIs in which the UE 120 is capable of transmitting the communication in an uplink channel (e.g., a PUSCH and/or a PUCCH), and not for TTIs in which the UE 120 is not allowed to transmit the communication in an uplink channel. Additionally, or alternatively, when the communication is a downlink communication, the UE 120 may increment a counter for determining a downlink opportunity only for TTIs in which the UE 120 is can expect to of receive the communication in a downlink channel (e.g., a PDSCH), and not for TTIs in which the UE 120 does not expect to receive the communication in a downlink channel. The UE 120 may identify the opportunity by incrementing the counter until the counter value is equal to the indicating opportunity timing value.

In some aspects, the UE 120 may use a slot configuration to determine the opportunity in which the communication is to be scheduled, transmitted, or received. A slot configuration may indicate, for a time period, whether slots in the time period are UL-centric slots, DL-centric slots, UL-only slots, DL-only slots, and/or the like. In some aspects, the slot configuration may be indicated to the UE 120 in a radio resource control (RRC) message (e.g., an RRC configuration message, an RRC reconfiguration message, and/or the like). Thus, the slot configuration may indicate which slots (or other TTIs) include opportunities that are to be counted (or not counted) to determine the opportunity in which the communication is to be scheduled, transmitted, or received.

In some aspects, a slot configuration may be indicated in DCI (e.g., in the case of a dynamic slot reconfiguration). In this case, the UE 120 may use the slot configuration indicated in DCI to determine the opportunity in which the communication is to be scheduled, transmitted, or received. For example, if the UE 120 is scheduled to transmit or receive a communication in a slot that has been reconfigured such that an opportunity in the slot is no longer available for transmission or reception of the communication, then the UE 120 may determine the next available opportunity as the opportunity for scheduling, transmitting, or receiving the communication. In this way, the UE 120 may account for dynamic reconfiguration of slots.

In this way, timing may be dynamically indicated, which increases a flexibility of scheduling in New Radio. Furthermore, the UE 120 may be capable of transmitting or receiving a timed communication regardless of configurations or reconfigurations of slots, as described in more detail above in connection with FIG. 9. In this way, communication errors may be reduced.

As indicated above, FIG. 10 is provided as an example. Other examples may differ from what is described with regard to FIG. 10.

Figure 11:
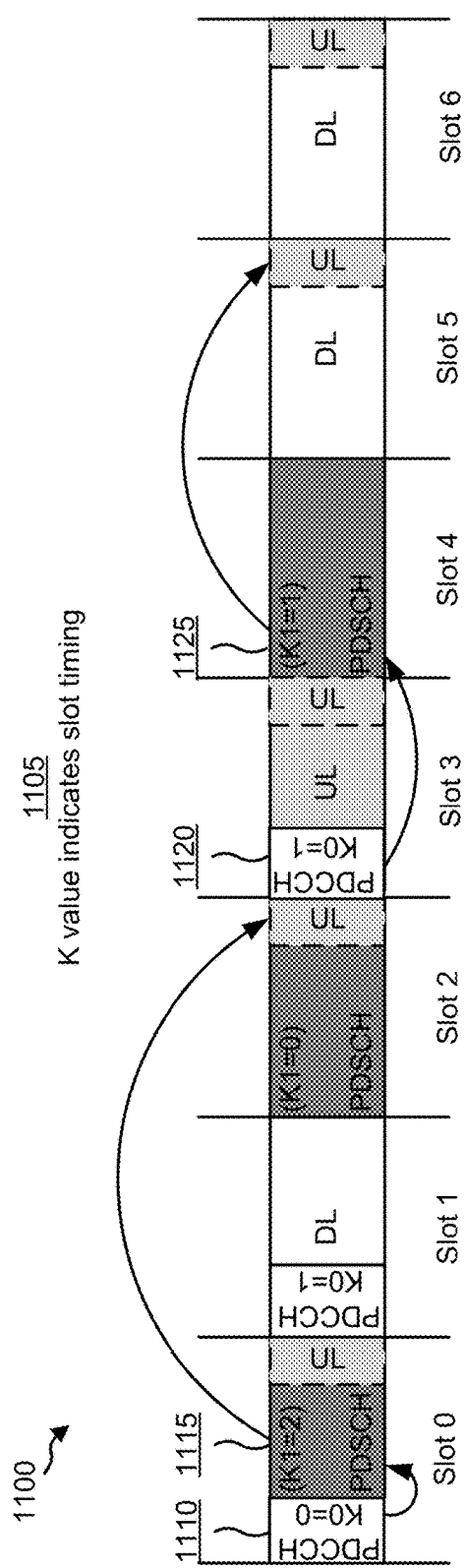

FIG. 11 is a diagram illustrating an example 1100 of dynamic DCI timing indications, in accordance with various aspects of the present disclosure. As shown by reference number 1105, example 1100 is an example where a timing value in DCI indicates a slot timing for a communication, as described above in connection with FIG. 9. FIG. 11 shows example timing values for K0, which indicates a timing between a downlink grant and reception of a downlink data communication corresponding to the downlink grant, and K1, which indicates a timing between reception of a downlink data communication and transmission of an ACK/NACK indication corresponding to the downlink data communication.

As shown by reference number 1110, a UE 120 may receive DCI in slot 0 (e.g., in a downlink control portion, PDCCH, and/or the like). The DCI in slot 0 may indicate a K0 value of 0, which indicates that a downlink data communication is scheduled for the UE 120 in the same slot as the DCI (e.g., in a downlink data portion of slot 0). As shown by reference number 1115, the DCI in slot 0 may further indicate that the downlink data communication in slot 0 is associated with a K1 value of 2, which indicates that an ACK/NACK indication, corresponding to the downlink data communication in slot 0, is to be transmitted in slot 2.

As shown by reference number 1120, the UE 120 may receive DCI in slot 3. The DCI in slot 3 may indicate a K0 value of 1, which indicates that a downlink data communication is scheduled for the UE 120 in the next slot after the DCI (e.g., in a downlink data portion of slot 4). As shown by reference number 1125, the DCI in slot 3 may further indicate that the downlink data communication in slot 4 is associated with a K1 value of 1, which indicates that an ACK/NACK indication, corresponding to the downlink data communication in slot 4, is to be transmitted in slot 5.

As indicated above, FIG. 11 is provided as an example. Other examples may differ from what is described with regard to FIG. 11.

Figure 12:
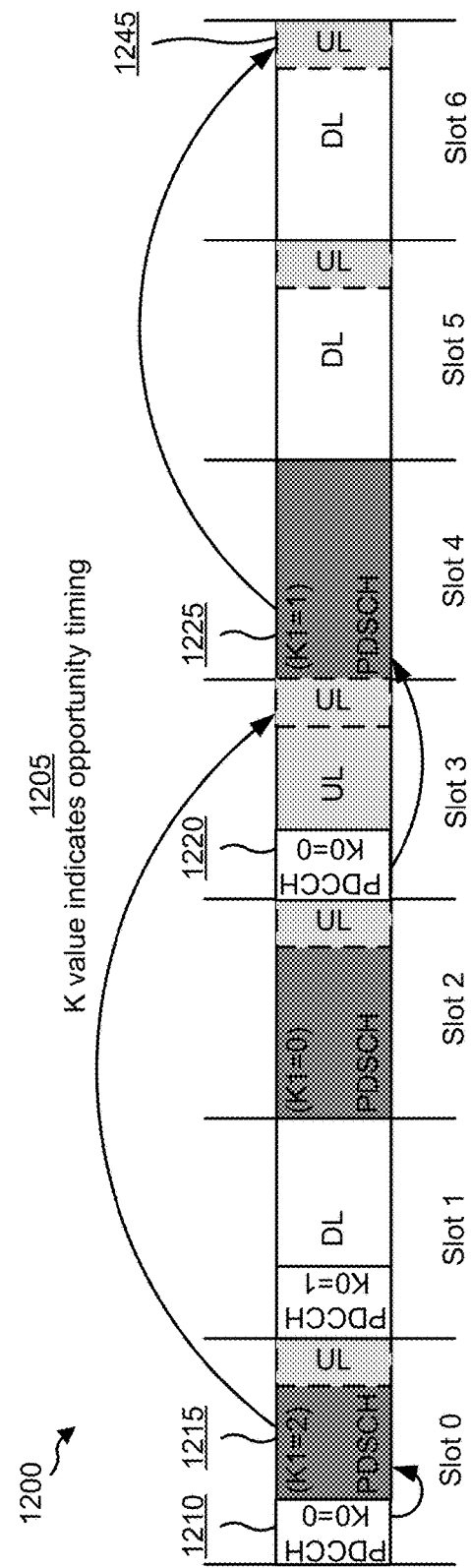

FIG. 12 is a diagram illustrating another example 1200 of dynamic DCI timing indications, in accordance with various aspects of the present disclosure. As shown by reference number 1205, example 1200 is an example where a timing value in DCI indicates an opportunity timing for a communication, as described above in connection with FIG. 10. FIG. 12 shows example timing values for K0 and K1, and shows differences between opportunity timing, shown in FIG. 12, and slot timing, shown in FIG. 11.

As shown by reference number 1210, a UE 120 may receive DCI in slot 0 (e.g., in a downlink control portion, PDCCH, and/or the like). The DCI in slot 0 may indicate a K0 value of 0, which indicates that a downlink data communication is scheduled for the UE 120 in a first downlink opportunity after the DCI (e.g., in a downlink data portion of slot 0). In this case, the same value for slot timing and opportunity timing (e.g., K0=0) indicate the same portion of the same slot.

As shown by reference number 1215, the DCI in slot 0 may further indicate that the downlink data communication in slot 0 is associated with a K1 value of 2, which indicates that an ACK/NACK indication, corresponding to the downlink data communication in slot 0, is to be transmitted in a third uplink opportunity after the downlink data communication, which corresponds to an uplink short burst portion in slot 3 (e.g., the uplink short burst portion in slot 0 is the first opportunity, the uplink short burst portion in slot 2 is the second opportunity, and the uplink short burst portion in slot 3 is the third opportunity). In this case, the same value for slot timing and opportunity timing (e.g., K1=2) indicates different slots.

As shown by reference number 1220, the UE 120 may receive DCI in slot 3. The DCI in slot 3 may indicate a K0 value of 0, which indicates that a downlink data communication is scheduled for the UE 120 in the first downlink opportunity after the DCI, which corresponds to a downlink data portion of slot 4. In this case, different values for slot timing and opportunity timing (e.g., K0=1 vs. K0=0) indicate the same slot and/or the same portion of the same slot.

As shown by reference number 1225, the DCI in slot 3 may further indicate that the downlink data communication in the first downlink opportunity (e.g., in slot 4) is associated with a K1 value of 1, which indicates that an ACK/NACK indication, corresponding to the downlink data communication in slot 4, is to be transmitted a second opportunity after the downlink data communication in slot 4, which corresponds to an uplink short burst portion in slot 6. In this case, the same value for slot timing and opportunity timing (e.g., K1=1) indicates different slots.

By using opportunity timing instead of slot timing, the UE 120 may adjust to situations where a slot, indicated by the slot timing for a communication, is configured or reconfigured to a slot format that does not include an opportunity to transmit or receive the communication, as described in more detail below in connection with FIGS. 13 and 14.

As indicated above, FIG. 12 is provided as an example. Other examples may differ from what is described with regard to FIG. 12.

FIG. 13 is a diagram illustrating an example 1300 of dynamic DCI timing indications, in accordance with various aspects of the present disclosure. As shown by reference number 1305, example 1300 is an example where a timing value in DCI indicates a slot timing for a communication, as described above in connection with FIG. 9. FIG. 13 shows example timing values for K2, which indicates a timing between an uplink grant and transmission of an uplink data communication corresponding to the uplink grant.

As shown by reference number 1310, a UE 120 may receive DCI in slot 0 (e.g., in a downlink control portion, PDCCH, and/or the like). The DCI in slot 0 may indicate a K2 value of 3, which indicates that an uplink data communication is to be transmitted by the UE 120 three slots after the slot in which the DCI is received by the UE 120. Thus, the UE 120 is scheduled to transmit the uplink data communication in an uplink data portion of slot 3. However, as shown by reference number 1315, if slot 3 is configured or re-configured to a type of slot that does not include an uplink opportunity, then the UE 120 may be unable to transmit the uplink data communication in slot 3, resulting in an error. By using an opportunity timing instead of a slot timing, the UE 120 may adjust to reconfigured slots, as described below in connection with FIG. 14.

As indicated above, FIG. 13 is provided as an example. Other examples may differ from what is described with regard to FIG. 13.

FIG. 14 is a diagram illustrating another example 1400 of dynamic DCI timing indications, in accordance with various aspects of the present disclosure. As shown by reference number 1405, example 1400 is an example where a timing value in DCI indicates an opportunity timing for a communication, as described above in connection with FIG. 10. FIG. 14 shows example timing values for K2, and shows how communication errors can be reduced when using opportunity timing as compared to slot timing.

As shown by reference number 1410, a UE 120 may receive DCI in slot 0. The DCI in slot 0 may indicate a K2 value of 0, which indicates that an uplink data communication is to be transmitted by the UE 120 in a first uplink opportunity (e.g., a first uplink data opportunity) after the DCI. As shown by reference number 1415, slot 3 may be configured or re-configured from a type of slot that includes an uplink opportunity to a type of slot that does not include an uplink opportunity. In this case, the UE 120 may wait for the first available uplink opportunity to transmit the uplink data communication. For example, as shown by reference number 1420, the first uplink opportunity after the DCI may occur in slot 5, and the UE 120 may transmit the uplink data communication in an uplink long burst portion of slot 5. By using opportunity timing, the UE 120 may adjust to reconfigured slots, thereby reducing communication errors.

Furthermore, by using opportunity timing rather than TTI timing (e.g., slot timing), the timing may be indicated using less overhead (e.g., fewer bits) reserved for indicating the timing because a smaller value may be used to cover a larger number of TTIs. For example, in FIG. 14, a K2 value of 3 requires 2 bits and indicates a third subsequent slot when slot timing is used, while a K2 value of 0 requires 1 bit and indicates a fifth subsequent slot when opportunity timing is used. Indicating the fifth subsequent slot using slot timing would require 3 bits to indicate a K2 value of 5. Furthermore, using opportunity timing provides increased flexibility to indicate any slot, as compared to using a slot timing with values that represent fixed slots.

In some aspects, the UE 120 may receive an indication of whether the UE 120 is to count both uplink long burst portions and uplink short burst portions as uplink opportunities. For example, a base station 110 may indicate whether the UE 120 is to count only uplink long burst portions as opportunities to transmit uplink data communications, or whether the UE 120 is to count both uplink long burst portions and uplink short burst portions as opportunities to transmit uplink data communications (e.g., because uplink data may be transmitted in an uplink short burst portion, in some aspects). In some aspects, a determination of which uplink opportunities to count may be based at least in part on a size of the uplink data communication. For example, if the size satisfies a threshold (e.g., is greater than or equal to the threshold), then the UE 120 may only count uplink long burst portions as uplink opportunities. Conversely, if the size does not satisfy a threshold (e.g., is less than or equal to the threshold), then the UE 120 may count both uplink long burst portions and uplink short burst portions as uplink opportunities.

Similarly, the base station 110 may indicate whether the UE 120 is to count only uplink short burst portions as opportunities to transmit uplink control communications (e.g., ACK/NACK indications), or whether the UE 120 is to count both uplink long burst portions and uplink short burst portions as opportunities to transmit uplink control communications (e.g., because UCI, such as an ACK/NACK indication, may be piggybacked on the PUSCH). In some aspects, the indication of which portions to count as opportunities may be indicated in DCI, and may be dynamically configured (e.g., for one or more timing values included in the DCI). Additionally, or alternatively, the indication may be received by the UE 120 in an RRC configuration message, a SIB, a group common control channel associated with multiple UEs 120, and/or the like.

As indicated above, FIG. 14 is provided as an example. Other examples may differ from what is described with regard to FIG. 14.

Figure 15:
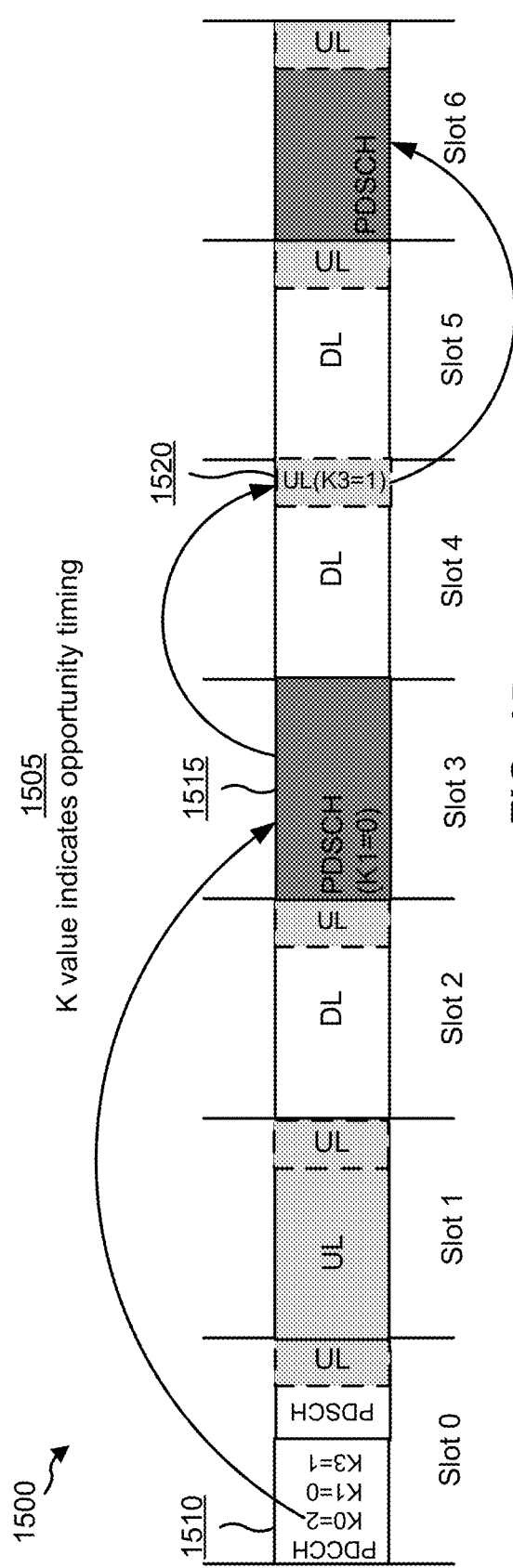

FIG. 15 is a diagram illustrating an example 1500 of dynamic DCI timing indications, in accordance with various aspects of the present disclosure. As shown by reference number 1505, example 1500 is an example where a timing value in DCI indicates an opportunity timing for a communication, as described above in connection with FIG. 10. FIG. 11 shows example timing values for K0 and K1, described in more detail elsewhere herein, and also for K3, which indicates a timing between a NACK indication and a corresponding retransmission.

As shown by reference number 1510, a UE 120 may receive DCI in slot 0. The DCI in slot 0 may indicate a K0 value of 2, which indicates that a downlink data communication is scheduled for the UE 120 in a third downlink opportunity after the DCI. In this case, the third downlink opportunity occurs in slot 3, after a first downlink opportunity (shown as PDSCH) in slot 0 and a second downlink opportunity in slot 2.

As shown by reference number 1515, the downlink data communication in slot 3 may be associated with a K1 value of 0, as indicated by the DCI in slot 0. The K1 value of 0 may indicate that an ACK/NACK indication, corresponding to the downlink data communication in slot 3, is to be transmitted in a first uplink opportunity after the downlink data communication. In this case, the first uplink opportunity occurs in slot 4.

As shown by reference number 1520, the ACK/NACK indication in slot 4 may be associated with a K3 value of 1, as indicated by the DCI in slot 0. In this case, if the ACK/NACK indication includes a NACK indication, the K3 value of 1 indicates that a retransmission of the downlink data communication that was negatively acknowledged in slot 4 (e.g., a retransmission of the downlink data communication that occurred in slot 3) is to occur in a second downlink opportunity after the ACK/NACK indication is transmitted. In this case, the second downlink opportunity occurs in slot 6, and the UE 120 may receive the retransmitted downlink data communication in slot 6.

By using opportunity timing, the base station 110 and the UE 120 may be capable of flexible and/or dynamic slot configurations and/or reconfigurations, while reducing scheduling errors.

As indicated above, FIG. 15 is provided as an example. Other examples may differ from what is described with regard to FIG. 15.

Figure 16:
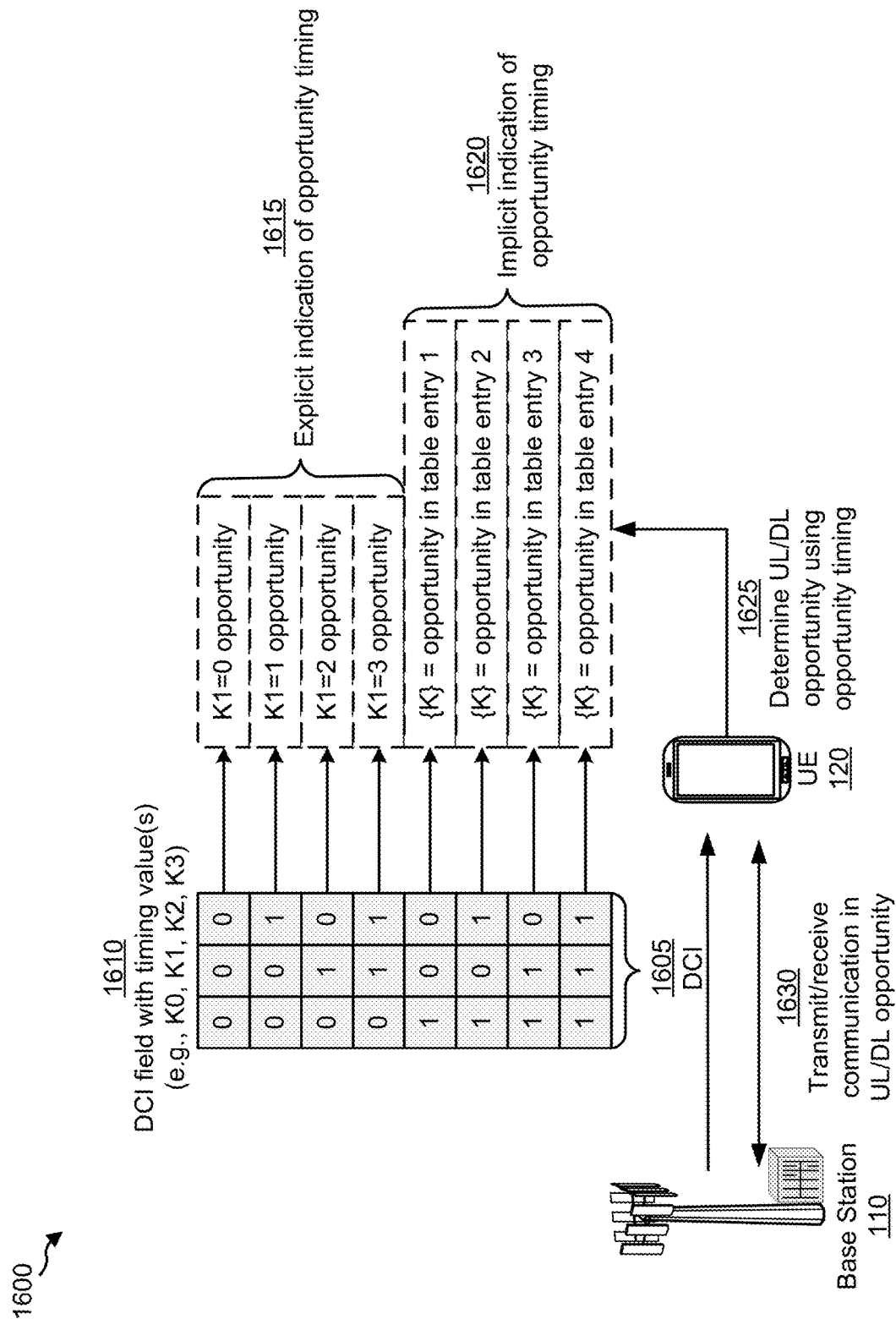

FIG. 16 is a diagram illustrating an example 1600 of dynamic DCI timing indications, in accordance with various aspects of the present disclosure.

As shown by reference number 1605, a UE 120 may receive DCI from a base station 110. As shown by reference number 1610, the DCI may include a field that explicitly or implicitly indicates a timing of an opportunity (e.g., an opportunity timing). In example 1600, the field is shown as having a length of 3 bits. In some aspects, other field lengths are possible (e.g., 2 bits, 4 bits, etc.). The timing of the opportunity may indicate an opportunity, subsequent to reception of the DCI, for transmission or reception of a communication corresponding to the DCI (e.g., a communication associated with a K0 value, a K1 value, a K2 value, a K3 value, and/or the like, as described in more detail elsewhere herein).

As shown by reference number 1615, an opportunity timing may be explicitly indicated by the value of the DCI field. For example, a bit value of 000 may correspond to a K1 value of 0 (e.g., a first opportunity), a bit value of 001 may correspond to a K1 value of 1 (e.g., a second opportunity), a bit value of 010 may correspond to a K1 value of 2 (e.g., a third opportunity), a bit value of 011 may correspond to a K1 value of 3 (e.g., a fourth opportunity), and/or the like. Other K values (e.g., K0, K2, K3, and/or the like) may be indicated in a similar manner.

As shown by reference number 1620, an opportunity timing may be implicitly indicated by the value of the DCI field. For example, a bit value of 100 may correspond to a K value indicated in a first entry of a table (e.g., a shared table stored by the base station 110 and the UE 120), a bit value of 101 may correspond to a K value indicated in a second entry of the table, a bit value of 110 may correspond to a K value indicated in a third entry of the table, a bit value of 111 may correspond to a K value indicated in a fourth entry of the table, and/or the like. In some aspects, the bit value may correspond to an index, and the UE 120 may look up one or more K values in the table using the index.

In some aspects, an entry in the table may store an opportunity timing value for a single K value. In this case, opportunity timings for different K values may be indicated in different DCI fields. In some aspects, an entry in the table may store opportunity timing values for multiple K values. In this case, opportunity timings for different K values may be indicated in a single DCI field. In this way, bits of the DCI may be conserved.

In some aspects, the DCI field may include only explicit indications of timing values. In some aspects, the DCI field may include only implicit indications of timing values. In some aspects, the DCI field may include both explicit and implicit indications of timing values (e.g., using different bit values of the DCI field). In some aspects, the DCI field may indicate only opportunity timings. In some aspects, the DCI field may indicate only slot timings. In some aspects, the DCI field may indicate both opportunity timings and slot timings (e.g., using different bit values of the DCI field). In this way, the DCI field may be flexibly configured.

As shown by reference number 1625, the UE 120 may determine an uplink opportunity or a downlink opportunity for transmission or reception of the communication based at least in part on the timing of the opportunity indicated in the DCI, as described in more detail elsewhere herein.

As shown by reference number 1630, the UE 120 may transmit or receive the communication in the determined uplink opportunity or downlink opportunity, as described in more detail elsewhere herein.

As indicated above, FIG. 16 is provided as an example. Other examples may differ from what is described with regard to FIG. 16.

Figure 17:
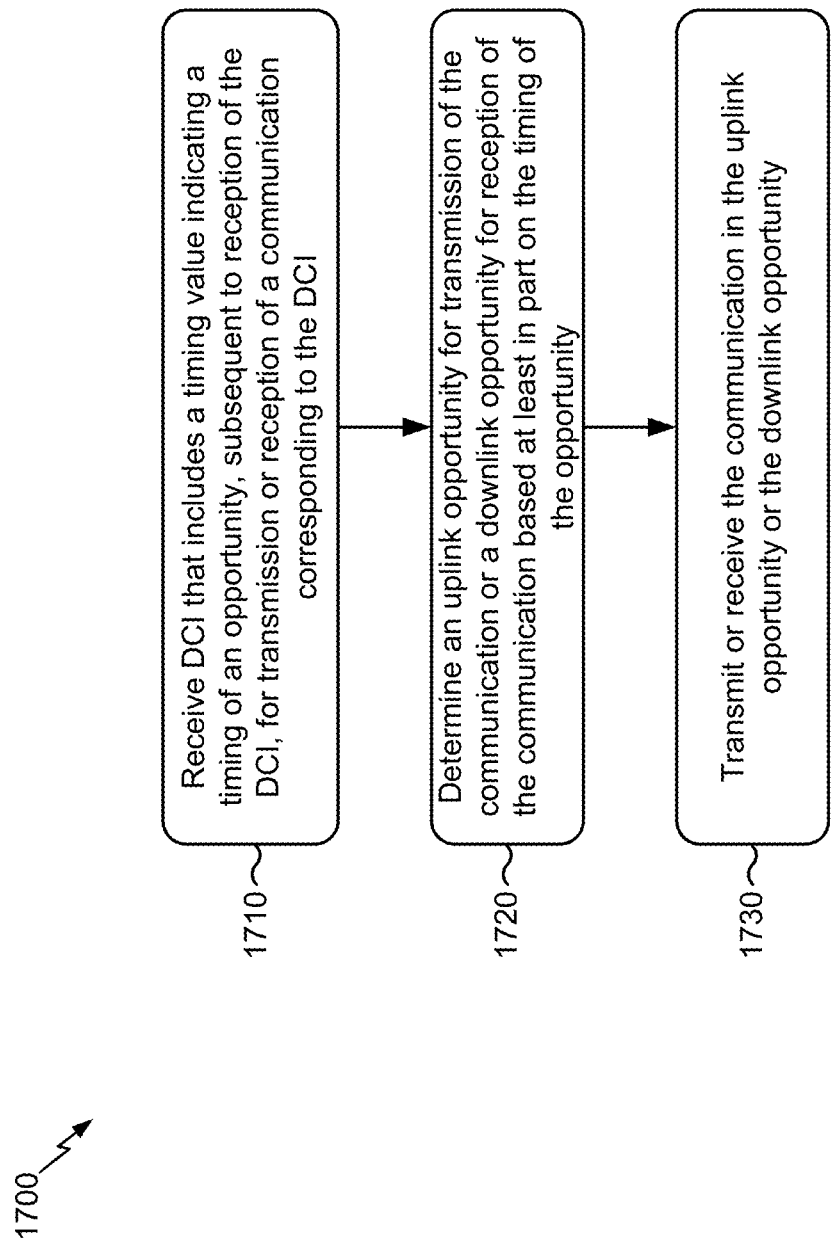
FIG. 17 is a diagram illustrating an example process performed, for example, by a user equipment, in accordance with various aspects of the present disclosure.

FIG. 17 is a diagram illustrating an example process 1700 performed, for example, by a UE, in accordance with various aspects of the present disclosure. Example process 1700 is an example where a UE (e.g., UE 120) uses dynamic DCI timing indications.

As shown in FIG. 17, in some aspects, process 1700 may include receiving DCI that includes a timing value indicating a timing of an opportunity, subsequent to reception of the DCI, for transmission or reception of a communication corresponding to the DCI (block 1710). For example, the UE may receive (e.g., using antenna 252, DEMOD 254, MIMO detector 256, receive processor 258, controller/processor 280, and/or the like) DCI that includes a timing value indicating a timing of an opportunity (e.g., an opportunity timing), as described above in connection with FIGS. 9-16. In some aspects, the timing value may indicate a timing of an opportunity, subsequent to reception of the DCI, for transmission or reception of a communication corresponding to and/or associated with the DCI.

As further shown in FIG. 17, in some aspects, process 1700 may include determining an uplink opportunity for transmission of the communication or a downlink opportunity for reception of the communication based at least in part on the timing of the opportunity (block 1720). For example, the UE may determine (e.g., using controller/processor 280 and/or the like) an uplink opportunity or a downlink opportunity for transmission or reception of the communication based at least in part on the timing of the opportunity, as described above in connection with FIGS. 9-16. In some aspects, a counter for determining the uplink opportunity is incremented only for TTIs in which the UE is allowed to transmit the communication in an uplink channel. In some aspects, a counter for determining the downlink opportunity is incremented only for TTIs in which the UE can expect to receive the communication in a downlink channel.

As further shown in FIG. 17, in some aspects, process 1700 may include transmitting or receiving the communication in the uplink opportunity or the downlink opportunity (block 1730). For example, the UE may transmit (e.g., using controller/processor 280, transmit processor 264, TX MIMO processor 266, MOD 254, antenna 252, and/or the like) the communication in the uplink opportunity, or may receive (e.g., using antenna 252, DEMOD 254, MIMO detector 256, receive processor 258, controller/processor 280, and/or the like) the communication in the downlink opportunity, as described above in connection with FIGS. 9-16.

Process 1700 may include additional aspects, such as any single aspect or any combination of aspects described below.

In some aspects, the TTIs are slots, mini-slots, or symbols. In some aspects, the timing of the opportunity represents a number of slots that include an opportunity, a number of mini-slots that include an opportunity, or a number of symbols that include an opportunity. In some aspects, the opportunity refers to a unit of slot, mini-slot, or symbol that is possible for the UE to transmit or receive in a corresponding direction in the unit. In some aspects, the uplink opportunity or the downlink opportunity is determined based at least in part on a slot configuration indicated to the UE. In some aspects, the slot configuration is indicated in at least one of: a radio resource control (RRC) message (e.g., regarding the uplink/downlink and flexible symbol configuration), DCI, or a combination thereof.

In some aspects, the timing value indicates a timing between a downlink grant included in the DCI and reception of the communication, wherein the communication is a downlink data communication corresponding to the downlink grant. In some aspects, the timing value indicates a timing between reception of a downlink data communication, granted in the DCI, and transmission of the communication, wherein the communication is an acknowledgement or negative acknowledgment (ACK/NACK) indication corresponding to the downlink data communication.

In some aspects, the timing value indicates a timing between reception of an uplink grant included in the DCI and transmission of the communication, wherein the communication is an uplink data communication corresponding to the uplink grant. In some aspects, the timing value indicates a timing between transmission of a NACK indication corresponding to a downlink data communication granted in the DCI and reception of the communication, wherein the communication is a retransmission of the downlink data communication.

In some aspects, the timing value indicates a first opportunity after reception of the DCI. In some aspects, the timing value indicates a second opportunity after reception of the DCI. In some aspects, the timing of the opportunity is explicitly indicated by a value of a field in the DCI. In some aspects, the timing of the opportunity is implicitly indicated by a value of a field in the DCI, wherein the value of the field maps to one or more opportunity timings, including the timing of the opportunity.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving downlink control information (DCI) that includes a timing value indicating a timing of an opportunity, subsequent to reception of the DCI, for transmission or reception of a communication corresponding to the DCI;
   determining an uplink opportunity for transmission of the communication or a downlink opportunity for reception of the communication based at least in part on the timing of the opportunity,
      wherein a counter for determining the uplink opportunity is incremented only for transmission time intervals (TTIs) in which the UE is allowed to transmit the communication in an uplink channel, or
      wherein a counter for determining the downlink opportunity is incremented only for TTIs in which the UE can expect to receive the communication in a downlink channel; and
   transmitting or receiving the communication in the uplink opportunity or the downlink opportunity.

2. The method of claim 1, wherein the TTIs are slots, mini-slots, or symbols.

3. The method of claim 1, wherein the timing of the opportunity represents a number of slots that include an opportunity, a number of mini-slots that include an opportunity, or a number of symbols that include an opportunity.

4. The method of claim 1, wherein the opportunity refers to a unit of slot, mini-slot, or symbol that is possible for the UE to transmit or receive in a corresponding direction in the unit.

5. The method of claim 1, wherein the uplink opportunity or the downlink opportunity is determined based at least in part on a slot configuration indicated to the UE.

6. The method of claim 5, wherein the slot configuration is indicated in at least one of:
   a radio resource control (RRC) message regarding uplink/downlink and flexible symbol configuration,
   DCI, or
   a combination thereof.

7. The method of claim 1, wherein the timing value indicates a timing between a downlink grant included in the DCI and reception of the communication, wherein the communication is a downlink data communication corresponding to the downlink grant.

8. The method of claim 1, wherein the timing value indicates a timing between reception of a downlink data communication, granted in the DCI, and transmission of the communication, wherein the communication is an acknowledgement or negative acknowledgment (ACK/NACK) indication corresponding to the downlink data communication.

9. The method of claim 1, wherein the timing value indicates a timing between reception of an uplink grant included in the DCI and transmission of the communication, wherein the communication is an uplink data communication corresponding to the uplink grant.

10. The method of claim 1, wherein the timing value indicates a timing between transmission of a NACK indication corresponding to a downlink data communication granted in the DCI and reception of the communication, wherein the communication is a retransmission of the downlink data communication.

11. The method of claim 1, wherein the timing of the opportunity is explicitly indicated by a value of a field in the DCI.

12. The method of claim 1, wherein the timing of the opportunity is implicitly indicated by a value of a field in the DCI, wherein the value of the field maps to one or more opportunity timings, including the timing of the opportunity.

13. A user equipment (UE) for wireless communication, comprising:
   memory; and
   one or more processors operatively coupled to the memory, the memory and the one or more processors configured to:
      receive downlink control information (DCI) that includes a timing value indicating a timing of an opportunity, subsequent to reception of the DCI, for transmission or reception of a communication corresponding to the DCI;
      determine an uplink opportunity for transmission of the communication or a downlink opportunity for reception of the communication based at least in part on the timing of the opportunity,
         wherein a counter for determining the uplink opportunity is incremented only for transmission time intervals (TTIs) in which the UE is allowed to transmit the communication in an uplink channel, or
         wherein a counter for determining the downlink opportunity is incremented only for TTIs in which the UE can expect to receive the communication in a downlink channel; and
      transmit or receive the communication in the uplink opportunity or the downlink opportunity.

14. The UE of claim 13, wherein the TTIs are slots, mini-slots, or symbols.

15. The UE of claim 13, wherein the timing of the opportunity represents a number of slots that include an opportunity, a number of mini-slots that include an opportunity, or a number of symbols that include an opportunity.

16. The UE of claim 13, wherein the uplink opportunity or the downlink opportunity is determined based at least in part on a slot configuration indicated to the UE.

17. The UE of claim 16, wherein the slot configuration is indicated in at least one of:
   a radio resource control (RRC) message,
   DCI, or
   a combination thereof.

18. The UE of claim 13, wherein the timing value indicates a timing between a downlink grant included in the DCI and reception of the communication, wherein the communication is a downlink data communication corresponding to the downlink grant.

19. The UE of claim 13, wherein the timing value indicates a timing between reception of a downlink data communication, granted in the DCI, and transmission of the communication, wherein the communication is an acknowledgement or negative acknowledgment (ACK/NACK) indication corresponding to the downlink data communication.

20. The UE of claim 13, wherein the timing value indicates a timing between reception of an uplink grant included in the DCI and transmission of the communication, wherein the communication is an uplink data communication corresponding to the uplink grant.

21. The UE of claim 13, wherein the timing value indicates a timing between transmission of a NACK indication corresponding to a downlink data communication granted in the DCI and reception of the communication, wherein the communication is a retransmission of the downlink data communication.

22. The UE of claim 13, wherein the timing of the opportunity is explicitly indicated by a value of a field in the DCI.

23. The UE of claim 13, wherein the timing of the opportunity is implicitly indicated by a value of a field in the DCI, wherein the value of the field maps to one or more opportunity timings, including the timing of the opportunity.

24. A non-transitory computer-readable medium storing instructions for wireless communication, the instructions comprising:
   one or more instructions that, when executed by one or more processors of a user equipment (UE), cause the one or more processors to:
      receive downlink control information (DCI) that includes a timing value indicating a timing of an opportunity, subsequent to reception of the DCI, for transmission or reception of a communication corresponding to the DCI;
      determine an uplink opportunity for transmission of the communication or a downlink opportunity for reception of the communication based at least in part on the timing of the opportunity,
         wherein a counter for determining the uplink opportunity is incremented only for transmission time intervals (TTIs) in which the UE is allowed to transmit the communication in an uplink channel, or
         wherein a counter for determining the downlink opportunity is incremented only for TTIs in which the UE can expect to receive the communication in a downlink channel; and
      transmit or receive the communication in the uplink opportunity or the downlink opportunity.

25. The non-transitory computer-readable medium of claim 24, wherein the TTIs are slots, mini-slots, or symbols, and wherein the timing of the opportunity represents a number of slots that include an opportunity, a number of mini-slots that include an opportunity, or a number of symbols that include an opportunity.

26. The non-transitory computer-readable medium of claim 24, wherein the uplink opportunity or the downlink opportunity is determined based at least in part on a slot configuration indicated to the UE.

27. The non-transitory computer-readable medium of claim 24, wherein the timing value indicates at least one of:
- a timing between a downlink grant included in the DCI and reception of the communication, wherein the communication is a downlink data communication corresponding to the downlink grant,
- a timing between reception of a downlink data communication, granted in the DCI, and transmission of the communication, wherein the communication is an acknowledgement or negative acknowledgment (ACK/NACK) indication corresponding to the downlink data communication,
- a timing between reception of an uplink grant included in the DCI and transmission of the communication, wherein the communication is an uplink data communication corresponding to the uplink grant, or
- a timing between transmission of a NACK indication corresponding to a downlink data communication granted in the DCI and reception of the communication, wherein the communication is a retransmission of the downlink data communication.

28. The non-transitory computer-readable medium of claim 24, wherein the timing of the opportunity is explicitly or implicitly indicated by a value of a field in the DCI.

29. An apparatus for wireless communication, comprising:
- means for receiving downlink control information (DCI) that includes a timing value indicating a timing of an opportunity, subsequent to reception of the DCI, for transmission or reception of a communication corresponding to the DCI;
- means for determining an uplink opportunity for transmission of the communication or a downlink opportunity for reception of the communication based at least in part on the timing of the opportunity,
  - wherein a counter for determining the uplink opportunity is incremented only for transmission time intervals (TTIs) in which the UE is allowed to transmit the communication in an uplink channel, or
  - wherein a counter for determining the downlink opportunity is incremented only for TTIs in which the UE can expect to receive the communication in a downlink channel; and
- means for transmitting or receiving the communication in the uplink opportunity or the downlink opportunity.

30. The apparatus of claim 29, wherein the uplink opportunity or the downlink opportunity is determined based at least in part on a slot configuration indicated to the apparatus.

* * * * *